May 13, 1930. R. BERNADY 1,758,592
AUXILIARY PILOTING DEVICE CHIEFLY FOR AIRCRAFT
Filed Dec. 22, 1928 4 Sheets-Sheet 1
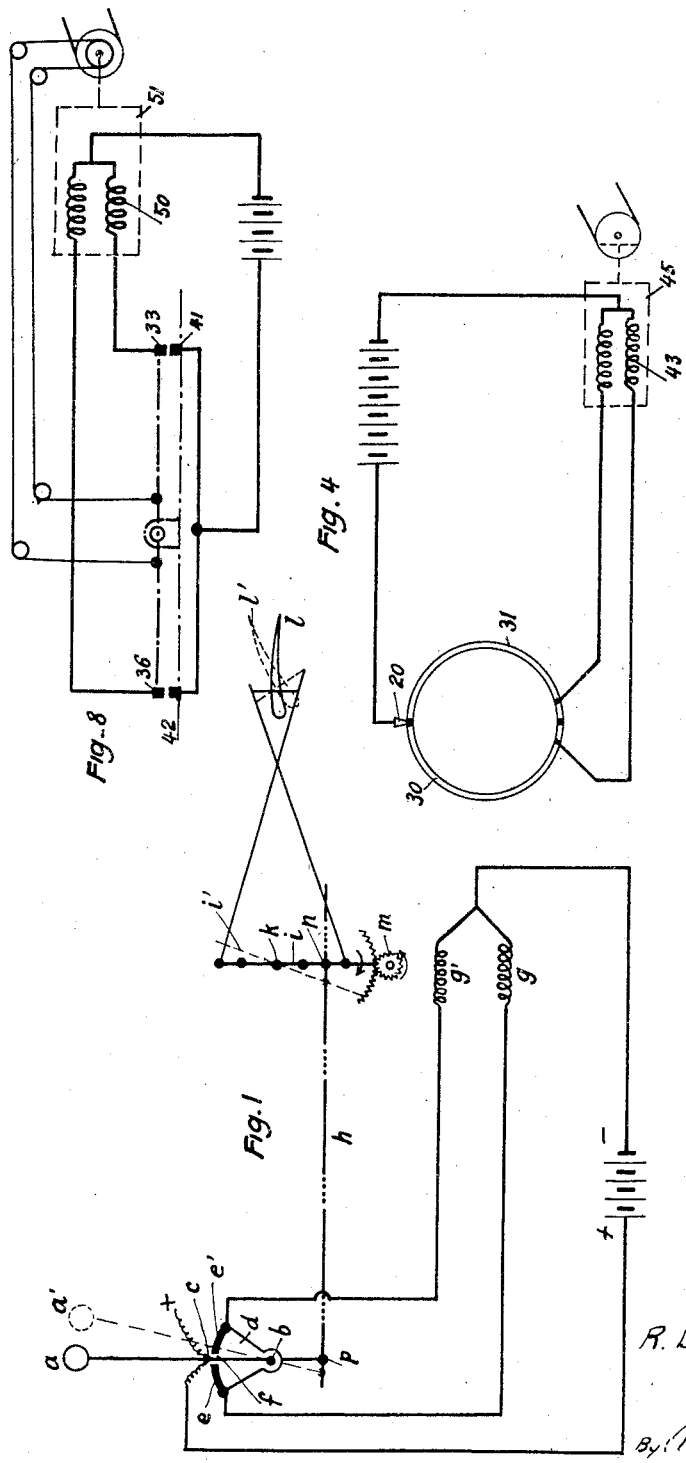

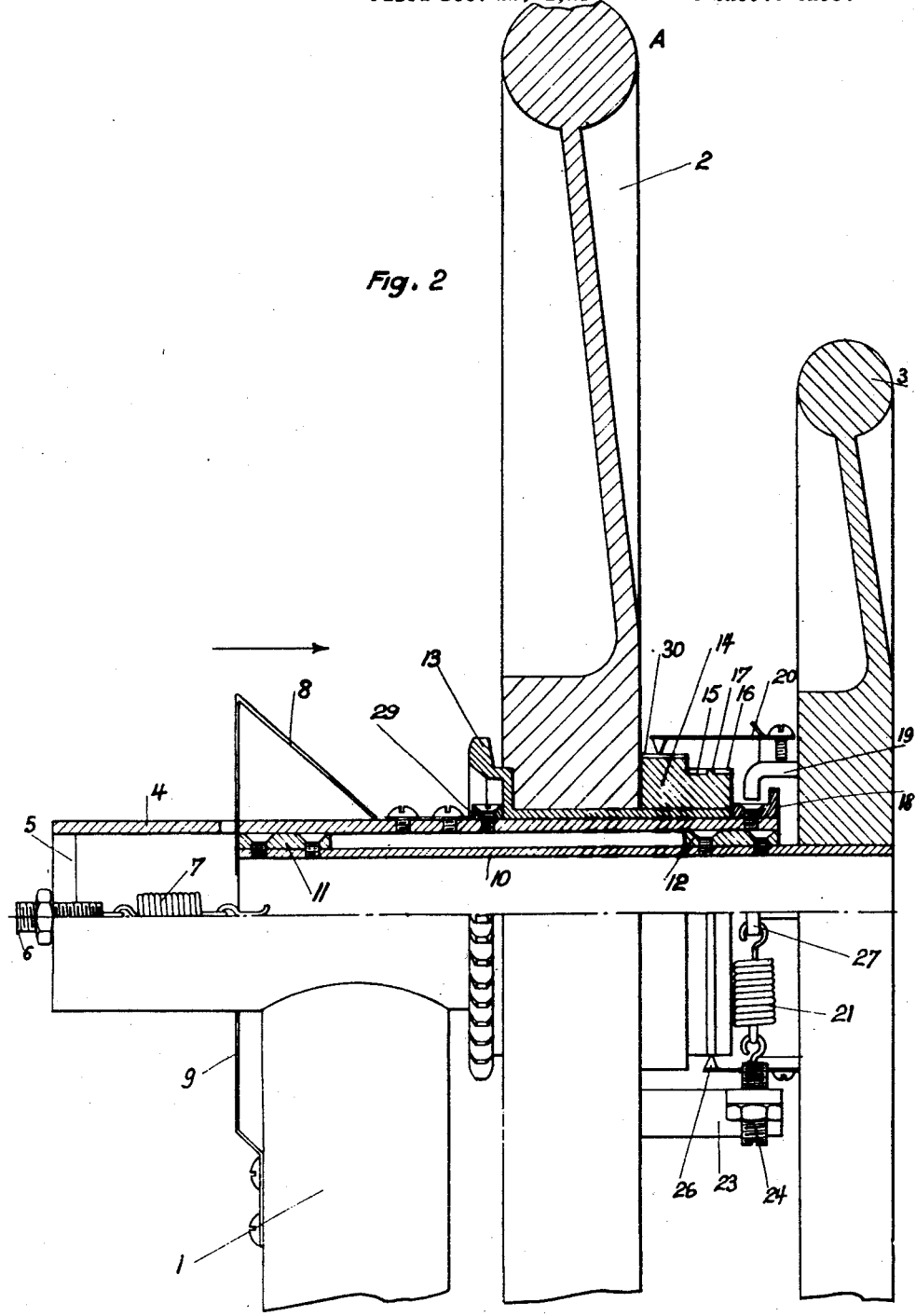

Sept. 29, 1931.   O. W. JOHNSON   1,825,592
FLYING BOAT
Filed March 27, 1930    4 Sheets-Sheet 3
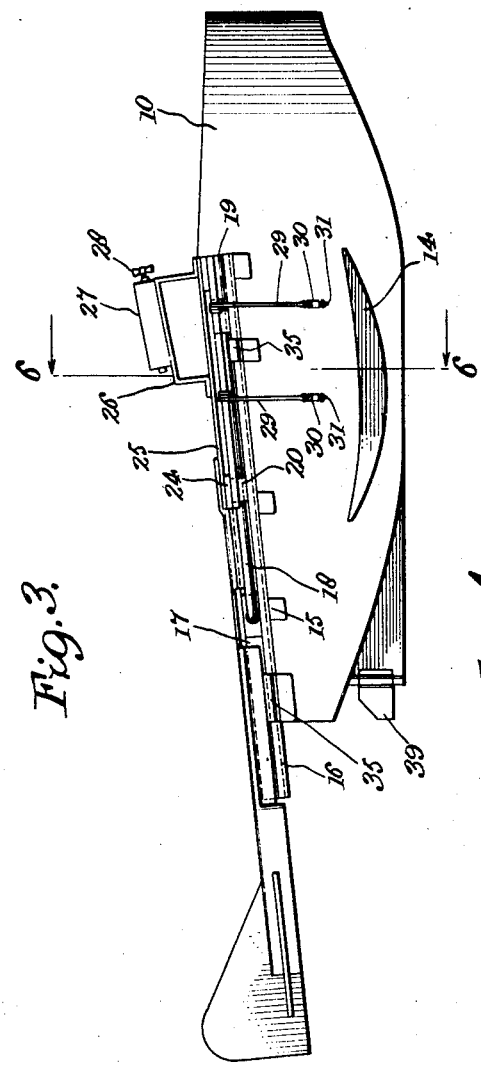
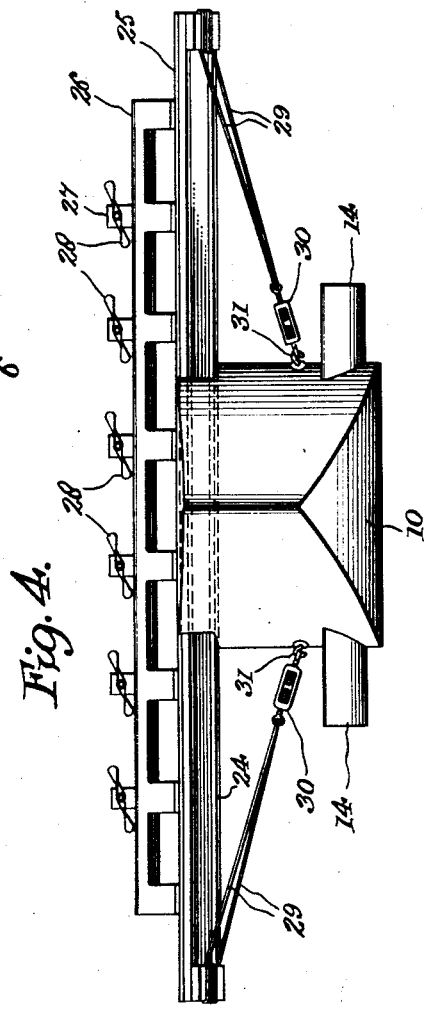
Inventor
O. W. Johnson
By Wilkinson & Mawhinney
Attorneys.

May 13, 1930. R. BERNADY 1,758,592
AUXILIARY PILOTING DEVICE CHIEFLY FOR AIRCRAFT
Filed Dec. 22, 1928 4 Sheets-Sheet 4
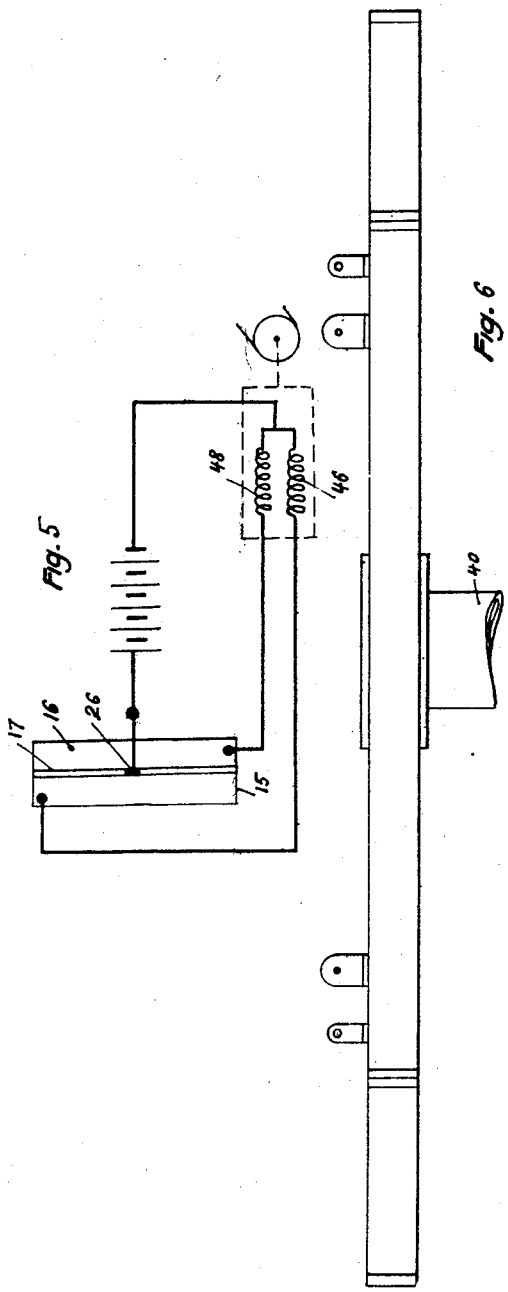
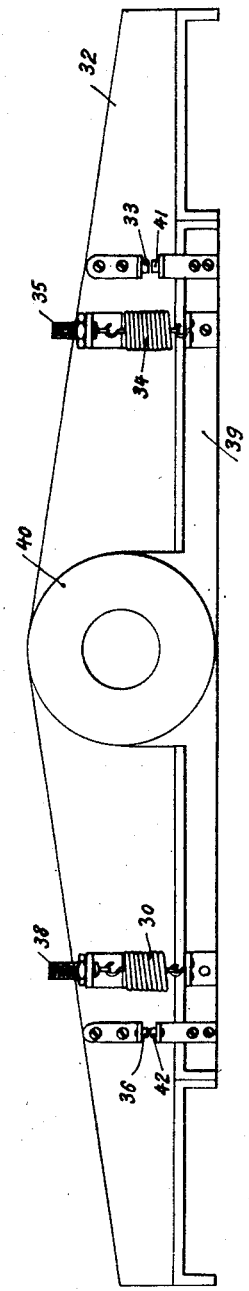
R. Bernady
INVENTOR Patented May 13, 1930

1,758,592

UNITED STATES PATENT OFFICE

RAOUL BERNADY, OF NEUILLY SUR SEINE FRANCE, ASSIGNOR TO SOCIÉTÉ D'ETUDES ET DE CONSTRUCTION D'APPAREILS DE TÉLÉMÉCANIQUE, OF SEINE, FRANCE, A BODY CORPORATE OF FRANCE

AUXILIARY PILOTING DEVICE CHIEFLY FOR AIRCRAFT

Application filed December 22, 1928, Serial No. 328,001, and in France December 31, 1927.

It is well known that the aeroplanes used nowadays chiefly those adapted to carry heavy loads require for their piloting a considerable muscular energy which is most tiring for pilot. Now, according to my invention, to the usual control device of the aeroplane (i. e. the control lever and the swingbar) which is retained, I add an auxiliary piloting control device which allows the same result to be obtained with an exceedingly small muscular energy, the main effort being provided by auxiliary motors.

I use therefor an auxiliary control part which causes a current to pass through suitable contacts through the windings of auxiliary motor which act on the piloting means such as vertical or horizontal rudder the balancing planes or the like generally controlled by the usual hand or foot control device. In its turn the reaction of the latter when moved together with the said piloting means or the like restores the original relationship between the auxiliary control part and the contacts controlled thereby.

I prefer to make the auxiliary control part move a brush between two contacts separated by an insulating part and connected with the windings of an auxiliary motor actuating the piloting means which would require in the general case a considerable muscular energy. In their turn these devices moving under the action of the auxiliary motors cause the normal control device to move and thereby to constrain the brush to return over the insulating part.

I have described hereinbelow by way of example a preferred form of execution of my invention which allows the pilot to use indifferently the normal or the automatic auxiliary control devices, the movements being the same in both cases. In view of this he may use for steering laterally and vertically an auxiliary control handwheel concentric with the normal handwheel and disposed preferably in front thereof, which auxiliary handwheel acting in the same manner as the normal handwheel, actuates directly the piloting means through its rotation and through its displacement along its axis. The pilot may also use for steering an auxiliary swing bar on which he acts exactly as he is used to act in the normal swing bar.

On appended drawing given by way of example,

Fig. 1 illustrates diagrammatically the general principle of the invention.

Fig. 2 is a sectional view through the axis of the handwheel in a preferred form of execution.

Fig. 3 is a sectional view taken along line AB of Fig. 2 and supposed examined by a person looking in the direction of the arrow.

Figs. 4 and 5 illustrate diagrammatically the working of the auxiliary motors controlling the horizontal and vertical rudders.

Figs. 6 and 7 are two views at 90° one from the other of the special swing bar.

Fig. 8 is a diagrammatic view of the circuit of the auxiliary steering motor.

On Fig. 1 the auxiliary control lever $a$ is mounted with a slight adjustable or constant friction on the stationary rod $b$. This lever $a$ is provided with a brush $c$ insulated with reference to the body of the apparatus and adapted to rub on a sector $d$ also mounted with slight friction on the rod $b$. This sector $d$ is provided with two conducting parts $e$, $e'$, separated by a neutral insulating part $f$ the width of which must be greater than that of the brush $c$. The conducting parts $e$, $e'$ are connected respectively with the electromagnets $g$ and $g'$ adapted to provide the starting of an auxiliary motor of any suitable known type.

The sector is mechanically connected through constraining means $h$ with a part $i$ pivotally secured to the rod $k$ and connected directly with the rudder $l$ which may be for instance that controlling the vertical motion of the aeroplane. The sector $d$ may be connected also with any other device controlling normally the movements of the aircraft.

The auxiliary motor actuates the pivoting part $i$ through any desired mechanical means according to requirements.

The working is as follows:

During normal flight, the auxiliary control lever is in the position $a$. When the aeroplane is to rise, the lever is brought to the position $a'$ whereupon the brush $c$ being in contact with the conducting part $e'$, the electromagnet $g'$ is live and causes the auxiliary motor to start and to make the gear wheel $m$ rotate in the direction of the arrow. The pivoting part $i$ moves and occupies the position $i'$ whereby the rudder $l$ is caused to occupy the position $l'$ and to make the aeroplane rise. On the other hand the rocking motion of part $i$ towards $i'$ displaces the sector $d$ through the constraining means $h$. The insulated part $f$ of the sector comes in front of the brush $c$ and the electric current is broken. The auxiliary motor stops and the aeroplane rises as long as the lever $a$ is not moved back towards its former position.

From the preceding, it may be easily understood that the pilot has merely to overcome the friction of the lever $a$ on the rod $b$ when controlling the movements of the aeroplane. The effort required may be equal to a few grammes if required as the friction between $a$ and $b$ may be adjustable.

On the other hand if the points $k$, $n$ and $p$ are adjustable on their levers, it is possible by modifying the length of the arms $bp$ and $kn$ to modify the ratio between the movements of the control lever $a$ and of the pivoting lever $i$.

For instance by increasing $kn$ or by reducing $bp$ the movements of the rudder become smaller for the same movement of the lever $a$.

On the contrary by diminishing $kn$ or by increasing $bp$ the movements of the rudder become greater for the same movement of the lever $a$.

The form of execution shown on Figs. 2 to 5 is adapted for use on most of the aeroplanes now on service wherein the horizontal and vertical steering is provided by a control lever carrying a hand wheel which is rotated by the pilot for displacing the balancing planes and pushed longitudinally by him for controlling the horizontal rudder, the vertical rudder being controlled by the foot through a swing bar.

The lever 1 which may be set very easily in place of the usual lever is provided at its end with an outer tube 4 inside which an inner tube 10 may rotate and slide with slight friction inside the babbit bearings 11 and 12. To the inner tube 10 is secured the auxiliary hand wheel 3. On the outer tube 4 is mounted with slight friction the main or normal hand wheel 2 connected with the balancing planes by the toothed wheel 13 over which passes the chain connected with the control cables. This hand wheel 2 is held in place longitudinally with reference to the tube 4 by two stops 29 and 18.

A stepped cylinder 14 of electric insulating material is secured to the handwheel 2 and is provided in its larger diameter part with two contacts 30 and 31 (Figs. 3 and 4) electrically connected with the electromagnets of the auxiliary motor controlling the balancing planes. These contacts are separated from each other by a neutral line parallel to the axis of the cylinder. A brush 20 secured to the auxiliary control handwheel 3 is adapted to rub on the larger part of the cylinder and the contacts borne by it. The brush 20 is fed from the electric supply provided on the aeroplane and is slightly less wide than the neutral insulating part.

On the smaller diameter part of the cylinder are fitted two rings 15 and 16 separated by an insulating part 17 disposed in a plane perpendicular to the axis of the handwheel. A brush 26 secured to the auxiliary control wheel 3 is adapted to rub on the smaller diameter part and is fed also with current. The rings 15 and 16 are connected with the electromagnets of the auxiliary motor controlling the horizontal rudder (Fig. 5).

The springs 8 and 9 cooperating with an antagonistic spring 7 allow the brush 26 to return over the corresponding insulating part as soon as the handwheel 3 is no longer actuated. Springs 21 and 22 allow the brush 20 to return over the corresponding insulating part as soon as the handwheel 3 is no longer actuated. The spring 7 may be adjusted through the screw 6 passing through the cover 5. The spring 21 may be adjusted through the screw 24 and urges the handwheel 3 towards the left. It is secured on one hand to the support 23 and on the other to the handwheel through the lug 27 (Fig. 3); similarly the spring 22 may be adjusted through the screw 25 and urges the handwheel 3 towards the right. It is secured on one hand to the support 23 and on the other to the handwheel 3 through the lug 28.

A projection 19 acts as a stop for the longitudinal motion of the handwheel. A stop might also be provided for it at the end of its allowed rotary movement.

Figs. 6 and 7 show the normal swing bar 32 integral with the tube 40 to which are attached the cables controlling the vertical rudder whereas the auxiliary swing bar is shown at 39.

The swing-bar 32 is provided with two adjustable electric contacts 33 and 36 and with supports for the screws 35 and 38 adapted to adjust the springs 34 and 37.

The auxiliary swing bar 39 pivotally secured to the tube 40 is provided with electric contacts 41 and 42 respectively in front of the contacts 33 and 36.

When at rest the springs 34 and 37 connecting the two swing bars are adjusted so as to leave an interval of about 1 mm. between the contacts 33—41 and 36—42.

The device works as follows:

*Vertical steering* (Figs. 2 and 5).—When it is desired to use the auxiliary motors for steering, these are first thrown into gear and fed with electric current. The brush 26 is held by the springs 7, 8, 9 on the insulated part 17. When it is desired to make the aeroplane rise, the auxiliary handwheel 3 is pulled whereby the spring 7 is tensioned and the brush 26 comes into contact with part 16. The electromagnet 48 is thus fed so as to make the auxiliary motor controlling the horizontal rudder move it in the aircraft raising direction through suitable cables and pulleys. The horizontal rudder moves with its lever 1 which is displaced rearwards together with the auxiliary handwheel 3. Consequently the insulating part 17 returns underneath the brush 26 and the current is broken. Simultaneously the spring 7 slackens. If the auxiliary motors are non-reversible the auxiliary handwheel 3 is released and the aircraft remains with the incline given to it.

The springs also urge constantly when the handwheel 3 is not rotated the inner tube 10 and therewith the handwheel 3 and the brush 26 into their neutral position with reference to the handwheel 2 for which the brush 26 is on part 17. Thus the pilot is always sure of being in the neutral position which is important when the auxiliary motor is thrown into gear.

For making the aeroplane move downwards the operations are reversed.

*Winding of the aeroplane* (Figs. 2, 3, 4).—If it is desired to wind or deflect the aeroplane towards the left the handwheel 3 is rotated leftwards, the spring 22 is tensioned and the brush 20 comes over the contact sector 30 whereby the electromagnet 43 of the auxiliary motor 45 is excited and the balancing planes are moved. They cause the handwheel 2 to rotate under the action of the pinion 13 whereby the insulating part is returned under the brush 20.

The springs 21, 22 urge constantly, when the handwheel 3 is released, the said handwheel in its neutral position, with reference to the handwheel 2.

For winding towards the right, the operations are provided in the opposite direction.

*Steering* (Figs. 6, 7, 8).—If it is desired to veer towards the right the pilot sets the foot corresponding to this direction on the auxiliary swing bar 39. The contact 33, 41 is closed whereby the electromagnet 50 controlling the auxiliary steering motor is excited. The vertical rudder rotates therefore together with the swing bar 32 and the contact 33, 41 is broken. As soon as the foot is removed, the springs 33, 37 restore the normal relative position between the two swing bars.

What I claim is:

1. A piloting device for aircraft comprising a sliding and rotatable manually operated lever, an auxiliary sliding and rotatable lever, handwheels for controlling said levers, auxiliary motors, circuits controlling said motors, two sets of two contacts borne by first lever and separated respectively by a longitudinal and by a transversal insulation, brushes borne by the second lever and adapted to move respectively over the sets of contacts and to be disposed over the insulation for the longitudinal or angular position of concordance of the levers, means whereby the relative rotary motion of the second handwheel or the relative longitudinal motion of the second lever with reference to the first lever or handwheel causes the corresponding circuit to close and to make the corresponding auxiliary motor start in a given direction, means for throwing the motors in and out of gear, a horizontal and a vertical rudder permanently connected with the first lever and adapted to be actuated by the rotary and longitudinal movements thereof, and means whereby each auxiliary motor when operative controls the corresponding rudder and returns therewith the first lever into concordance with the second.

2. A piloting device for aircraft comprising a sliding and rotatable manually operated lever, an auxiliary sliding and rotatable lever inside the first lever, handwheels for controlling said levers, two auxiliary motors, circuits controlling said motors, two sets of two contacts inserted in the circuits, borne by first lever and separated respectively by a longitudinal and by a transversal insulation, two brushes borne by the second lever and adapted to move respectively over the sets of contacts with which they cooperate and to be disposed over the insulation for the longitudinal or angular position of concordance of the levers, means whereby the relative rotary motion of the second handwheel or the relative longitudinal motion of the second lever with reference to the first lever or handwheel causes the corresponding circuit to close over the brush and one of the cooperating contacts and makes the corresponding auxiliary motor start in a given direction, means for throwing the motors in and out of gear, a horizontal and a vertical rudder permanently connected with the first lever and adapted to be actuated by the rotary and longitudinal movements thereof, and means whereby each auxiliary motor when operative controls the corresponding rudder and returns therewith the first lever into concordance with the second.

3. In a device as claimed in claim 1 the provision of springs connecting the second lever and handwheel with the first ones and urging said levers and handwheels into their original relative position.

4. A piloting device for aircraft comprising a sliding and rotatable manually operated lever, an auxiliary sliding and rotatable lever, handwheels for controlling said levers, auxiliary motors, circuits controlling said motors, two sets of two contacts borne by first lever inserted in two of the circuits and separated respectively by a longitudinal and by a transversal insulation, two brushes borne by the second lever and adapted to move respectively over the sets of contacts with which they cooperate and to be disposed over the insulation for the longitudinal or angular position of concordance of the levers, means whereby the relative rotary motion of the second handwheel or the relative longitudinal motion of the second lever with reference to the first lever or handwheel causes the corresponding circuit to close over the brush and one of the cooperating contacts and makes the corresponding auxiliary motor start in a given direction, means for throwing the motors in and out of gear, a horizontal and a vertical rudder permanently connected with the first lever and adapted to be actuated by the rotary and longitudinal movements thereof, means whereby an auxiliary motor when operative controls the corresponding rudder and returns therewith the first lever into concordance with the second, a main foot actuated swing-bar, an auxiliary swing-bar pivotally connected thereto, springs connecting the two swing bars and urging them into parallelism and two sets of cooperating contacts on the swing-bars adapted when pressed together to close the corresponding circuit and to make the corresponding auxiliary motor start in a given direction and balancing planes permanently and operatively connected with the main swing-bar and means whereby the auxiliary motor corresponding to the second swing bar controls when operative the said planes and returns therewith the first swing-bar into concordance with the second.

RAOUL BERNADY.